(12) United States Patent
Waki (10) Patent No.: US 11,642,729 B2
(45) Date of Patent: May 9, 2023

(54) ROTARY TOOL AND METHOD FOR MANUFACTURING CUT PRODUCT

(71) Applicant: KYOCERA CORPORATION, Kyoto (JP)

(72) Inventor: Masahiro Waki, Satsumasendai (JP)

(73) Assignee: KYOCERA Corporation, Kyoto (JP)

( * ) Notice: Subject to any disclaimer, the term of this patent is extended or adjusted under 35 U.S.C. 154(b) by 495 days.

(21) Appl. No.: 16/608,231

(22) PCT Filed: Apr. 19, 2018

(86) PCT No.: PCT/JP2018/016139
§ 371 (c)(1),
(2) Date: Oct. 25, 2019

(87) PCT Pub. No.: WO2018/198930
PCT Pub. Date: Jan. 11, 2018

(65) Prior Publication Data
US 2020/0290134 A1   Sep. 17, 2020

(30) Foreign Application Priority Data

Apr. 27, 2017   (JP) .............................. JP2017-088144

(51) Int. Cl.
*B23C 5/10*   (2006.01)
(52) U.S. Cl.
CPC ..................................... *B23C 5/10* (2013.01)
(58) Field of Classification Search
CPC .................. B23C 5/10; B23C 2226/27; B23C 2210/0492; B23C 2210/0407; B23C 2210/0485; B23C 2210/086; B23C 2210/543; B23C 2210/00; B23C 2210/12
See application file for complete search history.

(56) References Cited

U.S. PATENT DOCUMENTS

| | | | |
|---|---|---|---|
| 3,117,366 A | | 1/1964 | Castor |
| 4,227,837 A | * | 10/1980 | Yodoshi .................... B23C 5/10 407/53 |
| 4,285,618 A | * | 8/1981 | Shanley, Jr. .............. B23C 5/10 407/54 |

(Continued)

FOREIGN PATENT DOCUMENTS

| | | | | |
|---|---|---|---|---|
| CA | 2741681 A1 | * | 6/2010 | ............... B23C 5/10 |
| EP | 1072345 A2 | * | 1/2001 | ............... B23C 5/10 |

(Continued)

*Primary Examiner* — Nicole N Ramos
(74) *Attorney, Agent, or Firm* — Viering, Jentschura & Partner Mbb (57) ABSTRACT

A rotary tool may include a main body having a circular columnar body, including a rotation axis and extending from a first end to a second end. The main body may include first flutes, second flutes, a first cutting edge, and a second cutting edge. The first flutes may have a helix angle $\theta 1$ and the second flutes a reverse helix angle $\theta 2$. The first cutting edge may be located on a ridge line where the outer periphery of the main body intersects with the first flutes and the second cutting edge at a ridge line where the outer periphery of the main body intersects with the second flutes. The $\theta 2$ may be larger than the $\theta 1$, m≥5, m−n≥3, and m and n are coprime numbers, where m is the number of the first flutes and n is the number of the second flutes.

5 Claims, 8 Drawing Sheets

(56) References Cited

U.S. PATENT DOCUMENTS

| | | | | |
|---|---|---|---|---|
| 4,963,059 A | * | 10/1990 | Hiyama | ............... B23C 5/003 |
| | | | | 407/62 |
| 4,990,035 A | * | 2/1991 | Scheuch | ............... B23C 5/10 |
| | | | | 407/29.13 |
| 2013/0136548 A1 | * | 5/2013 | Takahashi | ............ B23C 5/165 |
| | | | | 407/54 |
| 2015/0093204 A1 | * | 4/2015 | Raynor | .................. B23C 5/10 |
| | | | | 407/32 |
| 2015/0147127 A1 | * | 5/2015 | Shpigelman | ............ B23C 5/10 |
| | | | | 407/54 |
| 2017/0216936 A1 | * | 8/2017 | Dodds | ..................... B23C 5/10 |
| 2019/0366453 A1 | * | 12/2019 | Huijs | ................. B23D 71/005 |

FOREIGN PATENT DOCUMENTS

| | | | |
|---|---|---|---|
| JP | H03-190615 A | | 8/1991 |
| JP | 2003094220 A | * | 4/2003 |
| JP | 2011-020248 A | | 2/2011 |

* cited by examiner

ROTARY TOOL AND METHOD FOR MANUFACTURING CUT PRODUCT

CROSS-REFERENCE TO RELATED APPLICATIONS

This application is a national stage entry according to 35 U.S.C. 371 of PCT Application No. PCT/JP2018/016139 filed on Apr. 19, 2018, which claims priority to Japanese Application No. 2017-088144 filed on Apr. 27, 2017, which are entirely incorporated herein by reference.

TECHNICAL FIELD

The present disclosure relates to rotary tools for use in a milling process.

BACKGROUND

An end mill in Patent Document 1 (Patent Document 1: Japanese Unexamined Patent Publication No. 2011-020248) may describe examples of rotary tools for carrying out milling processes on a workpiece. Examples of the workpiece include FRP (Fiber Reinforced Plastic), such as CFRP (Carbon Fiber Reinforced Plastic). The end mill discussed in Patent Document 1 may include a main cutting edge and a nick cutting edge that may be disposed at a reverse helix angle twisted oppositely to a helix angle of the main cutting edge. A difference between the number of gullets of the main cutting edge and the number of groove lines of the nick cutting edge may be set to be 2 or less. With the end mill discussed in Patent Document 1, cutting performance for fibers included in the FRP may be enhanced because of the main cutting edge and the nick cutting edge which are twisted in opposite directions.

Because chip discharge performance may degrade in the nick cutting edge that may be disposed at the reverse helix angle, there may be a desire to increase the reverse helix angle of a nick flute located along the nick cutting edge. It may be, however, difficult to increase the reverse helix angle of the nick flute because the difference between the number of gullets of the main cutting edge and the number of groove lines of the nick cutting edge may be 2 or less in the end mill described in Patent Document 1.

Attempts to decrease the number of groove lines of the nick cutting edge may be conceivable to increase the reverse helix angle of the nick flute. However, a mere decrease in the number of groove lines of the nick cutting edge may cause a failure in obtaining the effect of cutting fibers by the nick cutting edge as discussed in Patent Document 1.

Hence, there has been a demand for a rotary tool that ensures a proper discharge of chips while appropriately cutting fibers in a workpiece including the fibers, such as FRP.

SUMMARY

A rotary tool in a non-limiting embodiment may include a main body having a circular columnar shape, including a rotation axis and extending from a first end to a second end. The main body may include a plurality of first flutes and a first cutting edge. The first flutes may be located on an outer periphery of the main body and may go toward a rear side in a rotation direction of the rotation axis at a helix angle $\theta1$ as going toward the second end. The first cutting edge may be located on at least a part of a ridge line where the outer periphery of the main body intersects with the first flutes.

The main body may also include a plurality of second flutes and a second cutting edge. The second flutes may be located on the outer periphery of the main body. The second flutes may go toward a front side in the rotation direction of the rotation axis at a reverse helix angle $\theta2$ as going toward the second end. The second flutes may intersect with the first flutes. The second cutting edge may be located on at least a part of a ridge line where the outer periphery of the main body intersects with the second flutes. The $\theta2$ may be larger than the $\theta1$, $m \geq 5$, $m-n \geq 3$, and m and n are coprime numbers where m is the number of the first flutes and n is the number of the second flutes.

DETAILED DESCRIPTION

A rotary tool 1 in a non-limiting embodiment is described in detail below with reference to the drawings. Although the end mill 1 is illustrated as a non-limiting embodiment of the rotary tool 1 in the present non-limiting embodiments, the rotary tool may be, for example, a reamer without being limited to the end mill.

For the sake of description, the drawings referred to in the following illustrate, in a simplified form, main members of members constituting each of the non-limiting embodiments. The rotary tools are therefore capable of including any arbitrary structural member not illustrated in the drawings referred to. Sizes of the members in each of the drawings do not faithfully represent sizes and size ratios of actual structural members.

Figure 1:
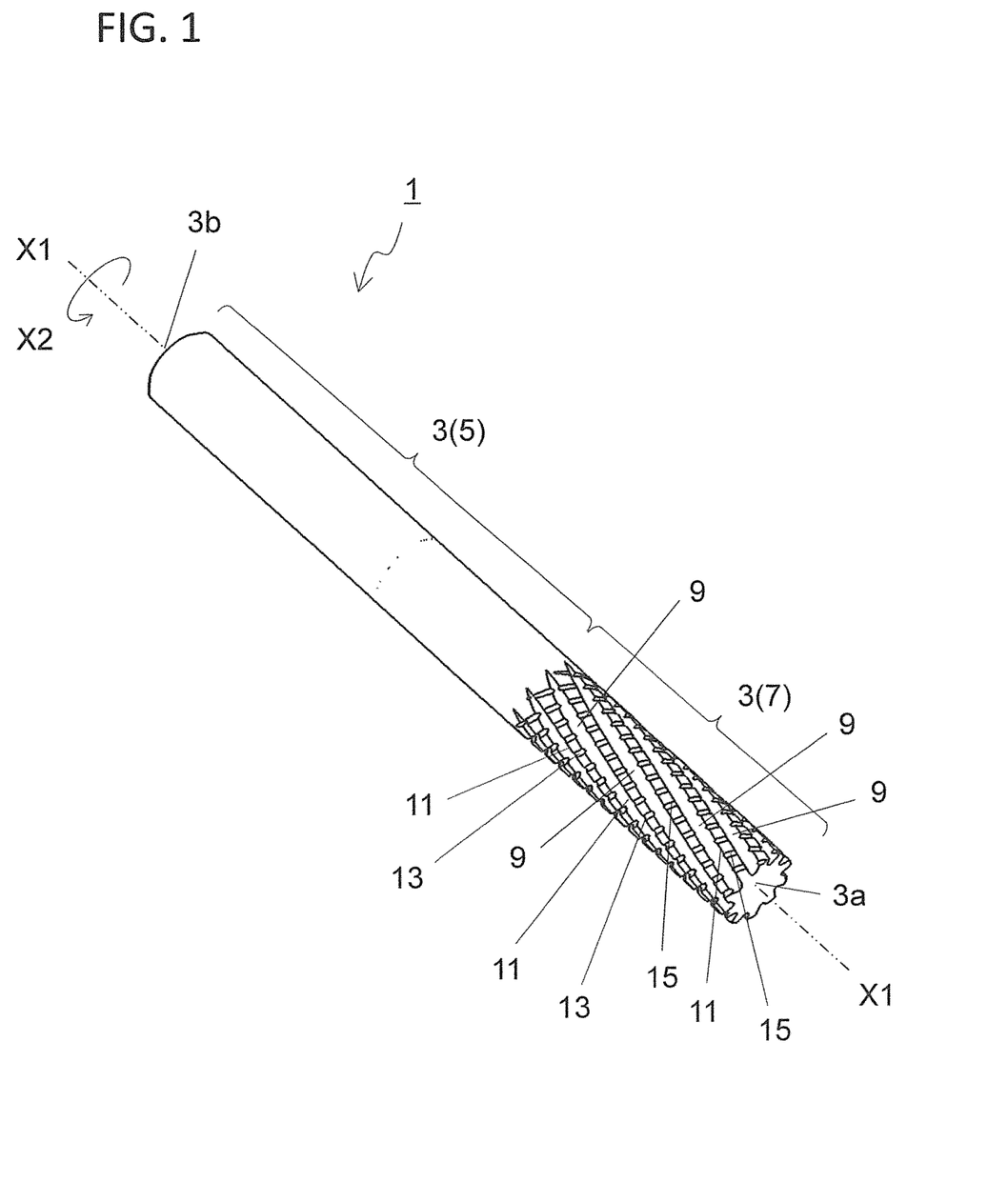
FIG. 1 is a perspective view illustrating a rotary tool (end mill) in a non-limiting embodiment.
Figure 2:
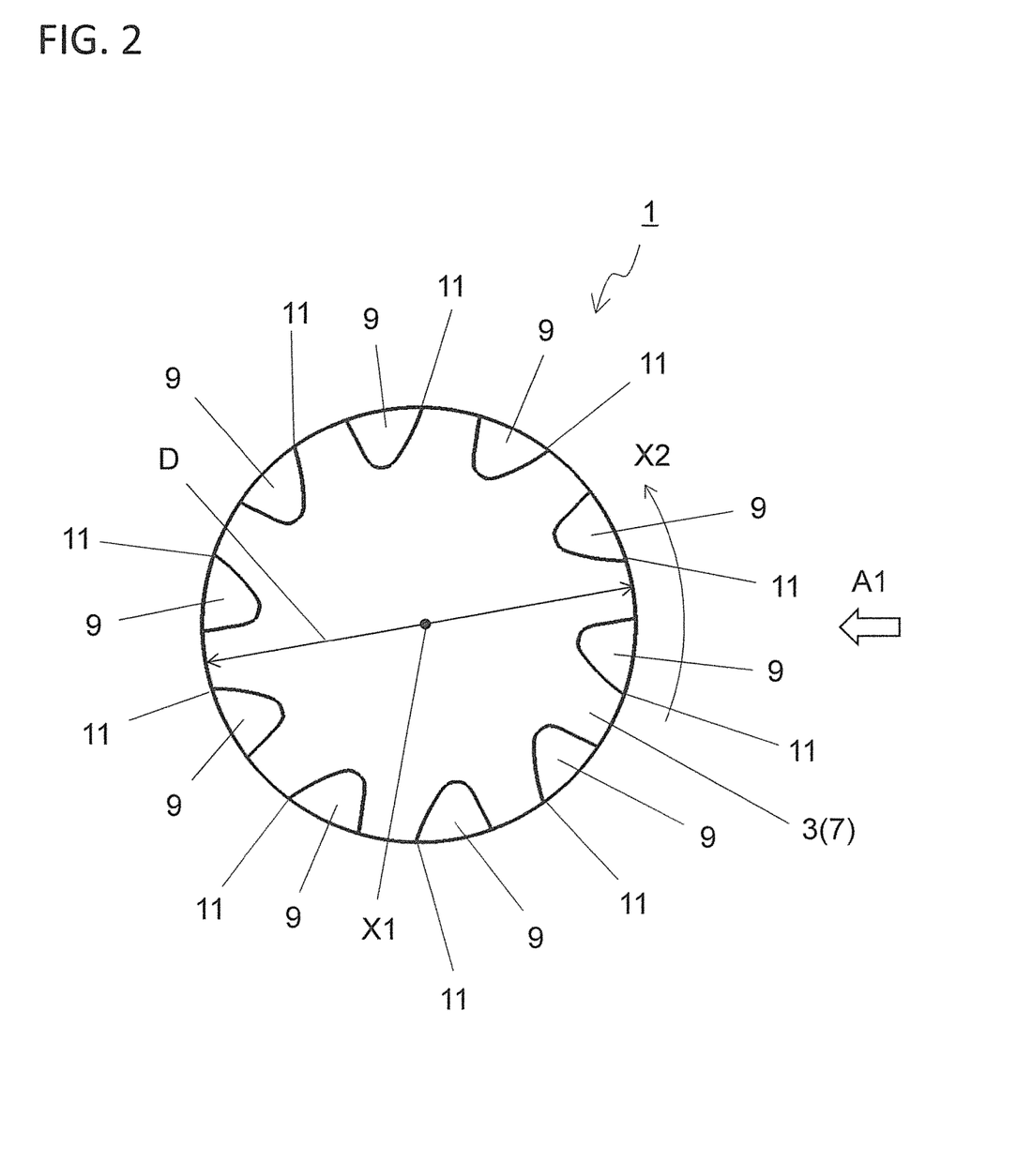
FIG. 2 is a front view of the end mill illustrated in FIG. 1 when viewed toward a first end.
Figure 3:
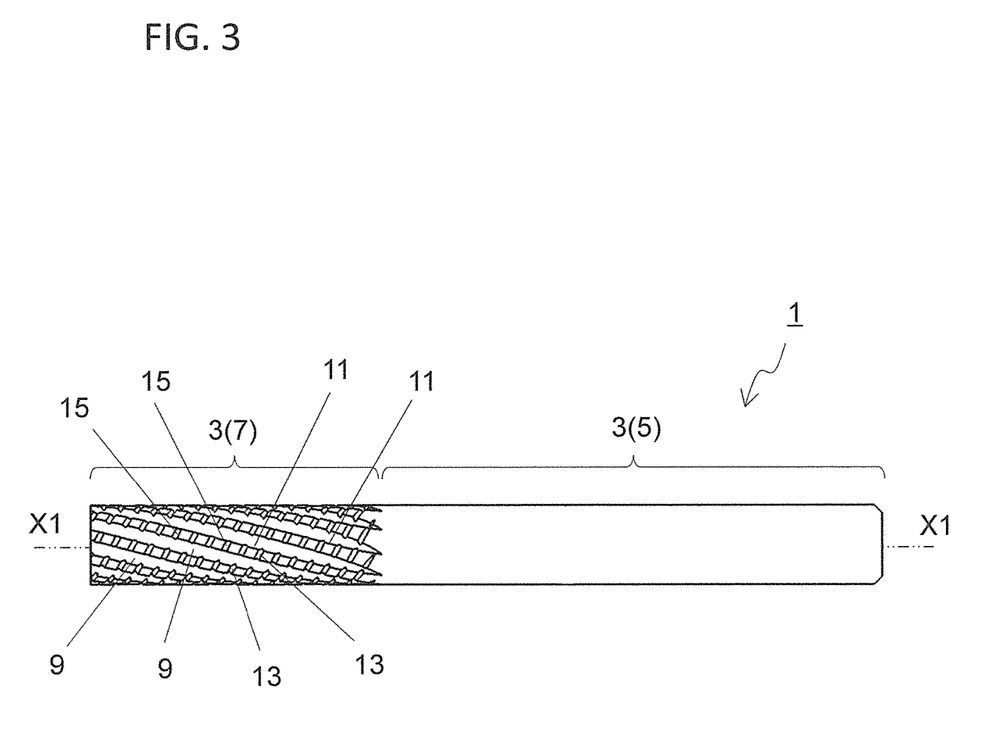
FIG. 3 is a side view of the end mill illustrated in FIG. 2 when viewed from the direction A1.

The rotary tool 1 (end mill 1) includes a column-shaped main body 3 that has a circular columnar shape, includes a rotation axis X1 and extends from a first end 3a to a second end 3b in the non-limiting embodiments as illustrated in FIG. 1 and the like. In general, the first end 3a is called "a front end" and the second end 3b is called "a rear end." The main body 3 is rotatable about the rotation axis X1 and is rotated about the rotation axis X1 in the step of cutting out a workpiece for manufacturing a cut product. Arrow X2 in FIG. 1 and the like indicates a rotation direction of the main body 3.

The main body 3 is composed of a holding part 5 that is called "a shank" and a cutting part 7 that is called "a body." The holding part 5 is the part to be held by, for example, a spindle in a machine tool (not illustrated). A shape of the holding part 5 is therefore designed according to a shape of the spindle. The cutting part 7 is located closer to a side of the first end 3a than the holding part 5. The cutting part 7 is the part that is brought into contact with a workpiece and plays a major role in the cutting process of the workpiece.

Figure 4:
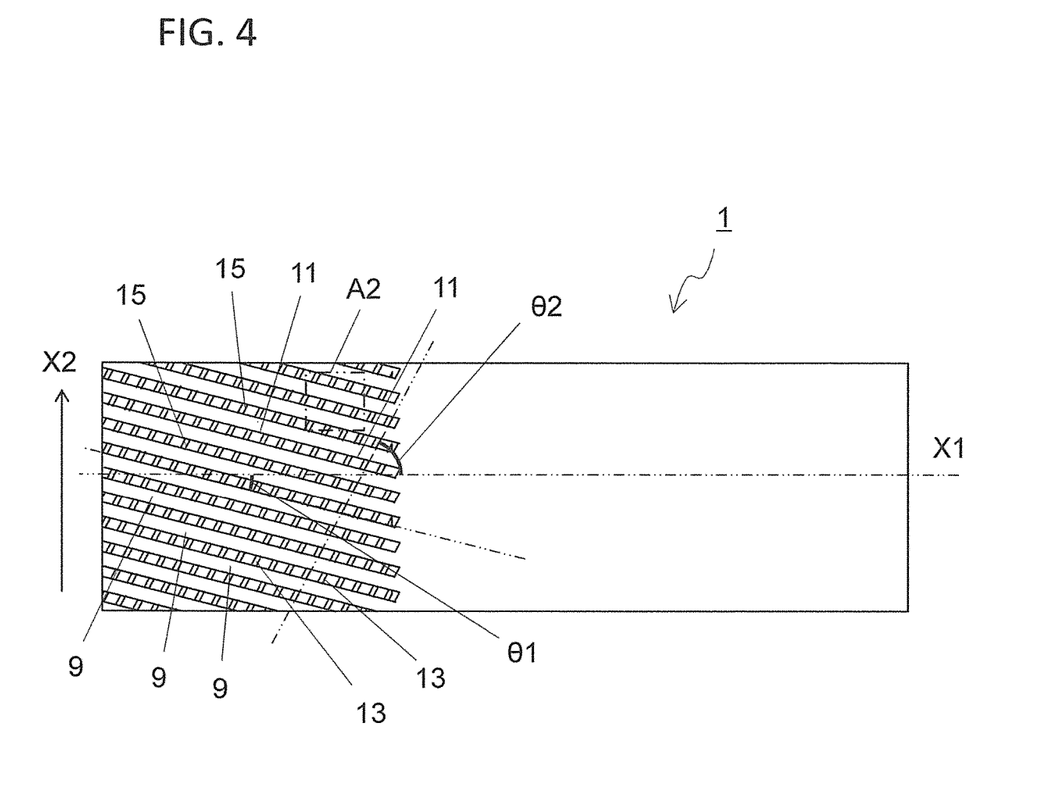
FIG. 4 is a developed view illustrating outlines of first flutes and second flutes in the end mill illustrated in FIG. 1.

The main body 3 includes a plurality of first flutes 9, a plurality of first cutting edges 11, a plurality of second flutes 13 and a plurality of second cutting edges 15 in the non-limiting embodiments. The first flutes 9 are individually located on an outer periphery of the main body 3 and are twisted so as to go toward a rear side in the rotation direction X2 as going toward the second end 3b. Here, a helix angle of the first flutes 9 is taken as θ1. Each of the first flutes 9 extends straight in a developed view as illustrated in FIG. 4. Although the number of the first flutes 9 is not limited to a specific value, it is settable to, for example, 5-20.

Like the first flutes 9, the second flutes 13 are also located on the outer periphery of the main body 3. Contrary to the first flutes 9, the second flutes 13 are twisted so as to go toward a front side in the rotation direction X2 as going toward the second end 3b. Here, a reverse helix angle of the second flutes 13 is taken as θ2. Each of the second flutes 13 extends straight in the developed view as illustrated in FIG. 4. Although the number of the first flutes 9 is not limited to a specific value, it is settable to, for example, 2-17.

Figure 5:
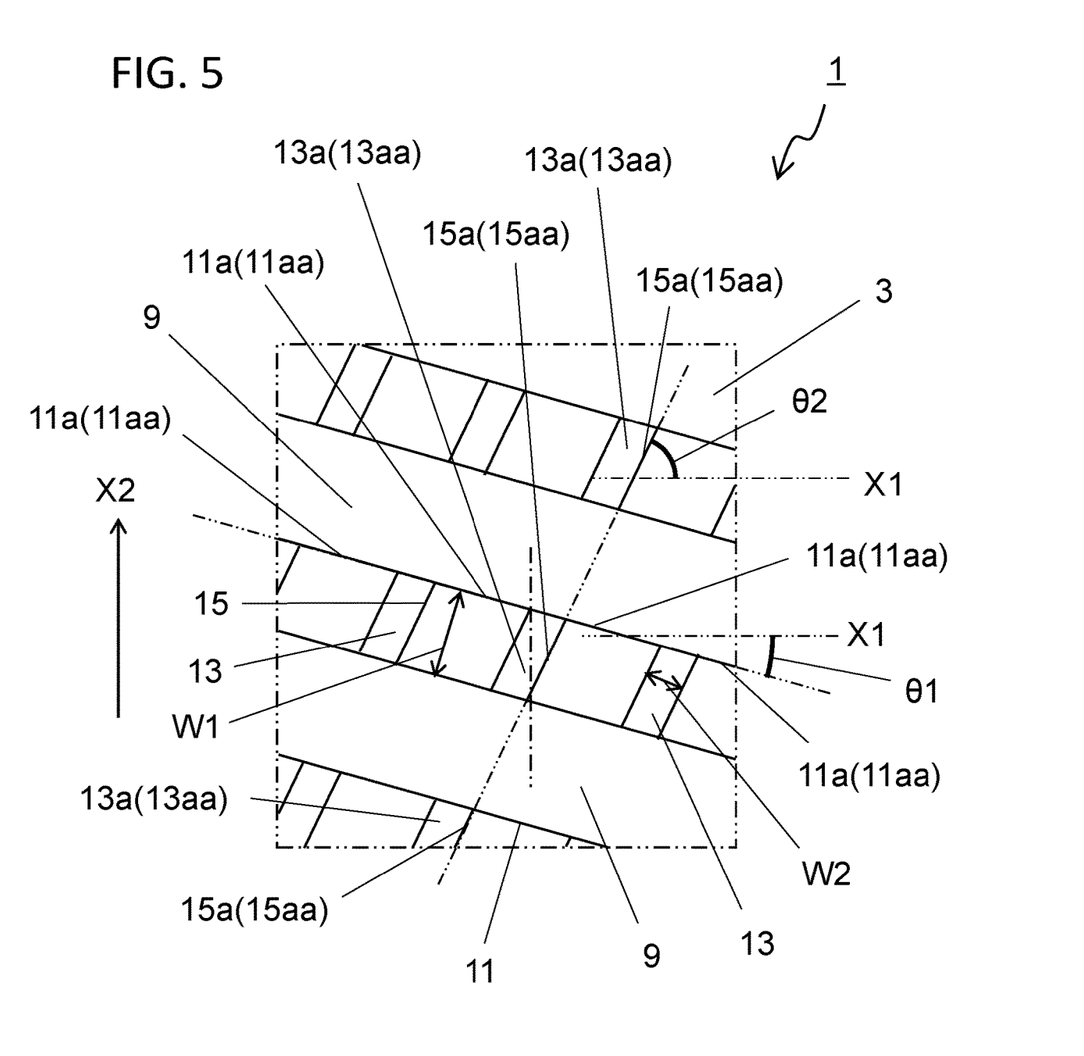
FIG. 5 is an enlarged view of a region A2 illustrated in FIG. 4.

The first flutes 9 intersect with second flutes 13 on the outer periphery of the main body 3, and the second flutes 13 are configured to be divided by the first flutes 9 in the non-limiting embodiments. Because the second flutes 13 are divided by the first flutes 9, the single second flute 13a is composed of a plurality of second flute elements 13aa being divided by the first flutes 9 as in a non-limiting embodiment illustrated in FIG. 5. The second flute elements 13aa are located along a single straight line because the second flutes 13 extend straight in the developed view.

The first cutting edges 11 are located on at least a part of a ridge line where the outer periphery of the main body 3 intersects with the first flutes 9. Although the first cutting edges 11 are individually located on the entirety of the ridge line where the outer periphery of the main body 3 intersects with the first flutes 9 in the non-limiting embodiments, the first flutes 11 are not necessarily located on the entirety of the ridge line where the outer periphery of the main body 3 intersects with the first flutes 9. Each of the first cutting edges 11 is a portion of a cutting edge generally called an outer peripheral cutting edge. Specifically, the first cutting edge 11 is also a portion of the cutting edge which plays a major role in the cutting process of the workpiece by using the end mill 1, and is also called a main cutting edge.

Because the first flutes 9 intersect with the second flutes 13 on the outer periphery of the main body 3, the first cutting edges 11 servable as the main cutting edge are divided by the second flutes 13. The second flutes 13 are therefore generally called nick flutes. Because the first cutting edges 11 are divided by the second flutes 13, it is possible to reword that the single cutting edge 11a located on the ridge line where the single first flute 9 intersects with the outer periphery of the main body 3 is composed of a plurality of first cutting edge elements 11aa being divided by the second flutes 13.

The second flutes 13 extend in a direction inclined at the reverse helix angle θ2 instead of a direction orthogonal to the rotation axis X1 in the non-limiting embodiments. Accordingly, the second cutting edge 15 are located on at least a part of the ridge line where the outer periphery of the main body 3 intersects with the second flutes 13.

Although the second cutting edges 15 are individually located on the ridge line where the outer periphery of the main body 3 intersects with the second flutes 13 in the non-limiting embodiments, the second cutting edges 15 are not necessarily located on the entirety of the ridge line where the outer periphery of the main body 3 intersects with the second flutes 13. The second cutting edges 15 are also called nick cutting edges because the second cutting edges 15 are located on the ridge line where the second flutes 13 also called nick flutes intersect with the outer periphery of the main body 3.

Because the first flutes 9 intersect with second flutes 13 on the outer periphery of the main body 3, the second cutting edges 15 servable as the nick cutting edges are divided by the first flutes 9. Because the second cutting edges 15 and the second flutes 13 are divided by the first flutes 9, it is possible to reword that the single second cutting edge 15a located on the ridge line where the single second flute 13 intersects with the outer periphery of the main body 3 is composed of a plurality of second cutting edge elements 15aa being divided by the first flutes 9.

If the workpiece is a material including fibers, a part of the fibers may remain without being cut out by the first cutting edges 11 because the first cutting edges 11 are twisted at the helix angle θ1. However, because the second cutting edges 15 are twisted at the reverse helix angle θ2, it is possible to cut out the remaining fibers by the second cutting edges 15.

Specifically, the reverse helix angle θ2 of the second flutes 13 is larger than the helix angle θ1 of the first flutes 9 in the end mill 1 of the non-limiting embodiments. This contributes to enhancing discharge performance for chips generated on the second cutting edges 15. Although specific values of θ1 and θ2 are not limited to predetermined values, for example, θ1 is settable to a value larger than 0° and smaller than 45°. If θ1 is a value smaller than 45°, a large area of an outer peripheral surface of the main body 3 can be ensured to enhance stiffness of the main body 3. In particular, if θ1 is larger than 10° and smaller than 30°, it is possible to further enhance the chip discharge performance and the stiffness of the main body 3.

If θ2 is larger than 45°, chips generated on the second cutting edges 15 can be sent out to the rear side in the rotation direction X2 in the second flutes 13, thereby making it easier for the chips to flow to the first flutes 9. This leads to the enhanced discharge performance for the chips generated on the second cutting edges 15. If θ2 is larger than 45°, an angle in a radial direction, namely, a direction orthogonal to the rotation axis X1 becomes small. Therefore, during the cutting process of the workpiece including fibers, such as FRP, it becomes easy to cut out the fibers. In particular, if θ2 is larger than 55° and smaller than 75°, the chip discharge performance can be further enhanced, and it becomes easier to cut out the fibers.

When the number of the first flutes 9 is indicated by "m" and the number of the second flutes 13 is indicated by "n" in the end mill 1 of the non-limiting embodiments, these numbers "m" and "n" satisfy relationships of m≥5 and m−n≥3 and are coprime numbers. In the non-limiting embodiment illustrated in FIG. 4, m=10 (≥5) and n=7 (m−n=10−7=3≥3). The non-limiting embodiment illustrated in FIG. 4 is a mere example, and there is no problem, for example, even if m=12 and n=5.

Because the number of the first flutes 9 is 5 or more, a cutting load applied to the first cutting edges 11 respectively located along the first flutes 9 can be dispersed to avoid excessive collection of the cutting load on the specific first cutting edge 11, thereby enhancing the durability of the main body 3. Additionally, because the number of the second flutes 13 is three or more below the number of the first flutes 9, it becomes possible to increase the reverse helix angle of the second flutes 13.

If "m" and "n" are not coprime numbers but have a common divisor except 1, positions of the second flutes 13 are synchronized with one another, and a region cut out only by the first cutting edge 11 is likely to increase. However, "m" and "n" are coprime numbers in the non-limiting embodiments. Accordingly, because the positions of the second flutes 13 do not tend to synchronize with one another, it is possible to reduce or eliminate the region cut out only by the first cutting edges 11 even if the number of the second flutes 13 is 3 or more below the number of the first flutes 9.

Thus, with the end mill 1 of the non-limiting embodiments, the effect of cutting out the fibers by the second cutting edges 15 can be well provided while enhancing the discharge performance of chips generated on the second cutting edges 15 by decreasing the number of the second flutes 13 and by increasing the reverse helix angle of the second flutes 13.

The end mill 1 is a tool used by right rotation in the non-limiting embodiments. Therefore, the first flutes 9 and the first cutting edges 11 are right twist, and the second flutes 13 and the second cutting edges 15 are left twist. The end mill 1 is, however, not limited to the above non-limiting embodiments. There is no problem, for example, even if the end mill 1 is a tool used by left rotation in which the first flutes 9 and the first cutting edges 11 are left twist and the second flutes 13 and the second cutting edge 15 are right twist.

Although widths and depths of the first flutes 9 and the second flutes 13 are not individually limited to predetermined values, for example, the width of each of the first flutes 9 may be larger than the width of each of the second flutes 13 in a side view. In cases where the first cutting edges 11 are the main cutting edge and the second cutting edges 15 are the nick cutting edges, the amount of chips generated by the first cutting edge 11 is likely to be larger than the amount of chips generated by the second cutting edges 15. However, if the width of each of the first flutes 9 is larger than the width of each of the second flutes 13 in the above configuration, it is possible to enhance the chip discharge performance in the end mill 1.

Alternatively, a width W2 of each of the second flutes 13 may be smaller than a distance W1 between the first flutes 9 adjacent to each other in the rotation direction X2 of the rotation axis X1 in the first flutes 9 as in the non-limiting embodiment illustrated in FIG. 4. In this case, a shape of the second flute 13 located between the first flutes 9 adjacent to each other in the rotation direction X2 of the rotation axis X1 becomes a long and narrow shape in a direction along the reverse helix angle θ2.

In cases where a workpiece is a material including fibers, the second cutting edges 15 are used mainly for cutting out fibers remaining without being cut out by the first cutting edge 11. If the second flutes 13 include the long and narrow shape as described above, a movable region for the remaining fibers tends to be restricted by the second flutes 13, and it therefore becomes easy to cut them out by the second cutting edges 15. This leads to a well finished surface of the workpiece.

Furthermore, if a depth of each of the second flutes 13 is larger than the width of each of the second flutes 13, space for discharging chips in the second flutes 13 can be ensured to enhance chip discharge performance in the second flutes 13.

In cases where the second cutting edges 15 are overlapped with an orthogonal line to the rotation axis X1 in an end portion of the first cutting edge element 11aa which is located at a side of the second end 3b in a side view, it is easy to stably cut out the fibers included in the workpiece, thus leading to a further improved finished surface of the workpiece.

Although dimensions of the main body 3 are not limited to specific values in the non-limiting embodiments, for example, a diameter (outer diameter) D of the main body 3 is settable to 5-40 mm, and a length in the direction along the rotation axis X1 of the cutting part 7 is settable to approximately 1.5-25 Dmm.

The outer diameter of the main body 3 may be constant or changed from a side of the first end 3a to a side of the second end 3b. For example, the outer diameter of the main body 3 may become smaller from the side of the first end 3a to the side of the second end 3b.

Examples of material constituting the main body 3 include metal, cemented carbide, cermet and ceramics. Examples of the metal include stainless steel and titanium. Examples of composition of the cemented carbide include WC (tungsten carbide)-Co(cobalt), WC—TiC(titanium carbide)-Co, WC—TiC—TaC(tantalum carbide)-Co, and WC—TiC—TaC—$Cr_3C_2$(chromium carbide)-Co. Here, WC, TiC, Tac, and $Cr_3C_2$ are hard particles, and Co is a binding phase.

The cermet is a sintered composite material obtained by compositing metal into a ceramic ingredient. A specific example of the cermet is one which is composed mainly of a titanium compound, such as TiC and TiN (titanium nitride). Examples of the ceramics include $Al_2O_3$ (aluminum oxide), $Si_3N_4$ (silicon nitride), and cBN (Cubic Boron Nitride).

The main body 3 may be composed only of the above-mentioned material or, alternatively may be composed of a member composed of the above-mentioned material and a coating layer (not illustrated) that covers the member. Examples of material constituting the coating layer include diamond, diamond-like carbon (DLC), TiC, TiN, TiCN (titanium carbonitride), TiMN (M is at least one kind of metal element selected from metals of periodic tables 4, 5 and 6, except for Ti, and Al and Si), and $Al_2O_3$.

It is possible to improve wear resistance of the first cutting edges 11 and the second cutting edges 15 if the main body 3 includes the above coating layer. In particular, if the coating layer includes diamond, the end mill 1 demonstrates good wear resistance even if a workpiece is a ceramic material.

The coating layer can be deposited, for example, by vapor phase synthesis method. Examples of the vapor phase synthesis method include chemical vapor deposition (CVD) method and physical vapor deposition (PVD) method. A thickness of the coating layer is settable to, for example, 0.3-20 μm. A suitable range differs depending on a composition of the coating layer.

While the end mills 1 of the non-limiting embodiments have been illustrated and described above, the present disclosure is not limited thereto but can be an arbitrary one as long as it does not depart from the scope of the present disclosure.

(Method for Manufacturing Cut Product)

A method for manufacturing a cut product in a non-limiting embodiment is described in detail below by taking as one non-limiting embodiment the case of using the end mill 1 in the foregoing non-limiting embodiment. The method is described below with reference to FIGS. 6 to 8.

Figure 6:
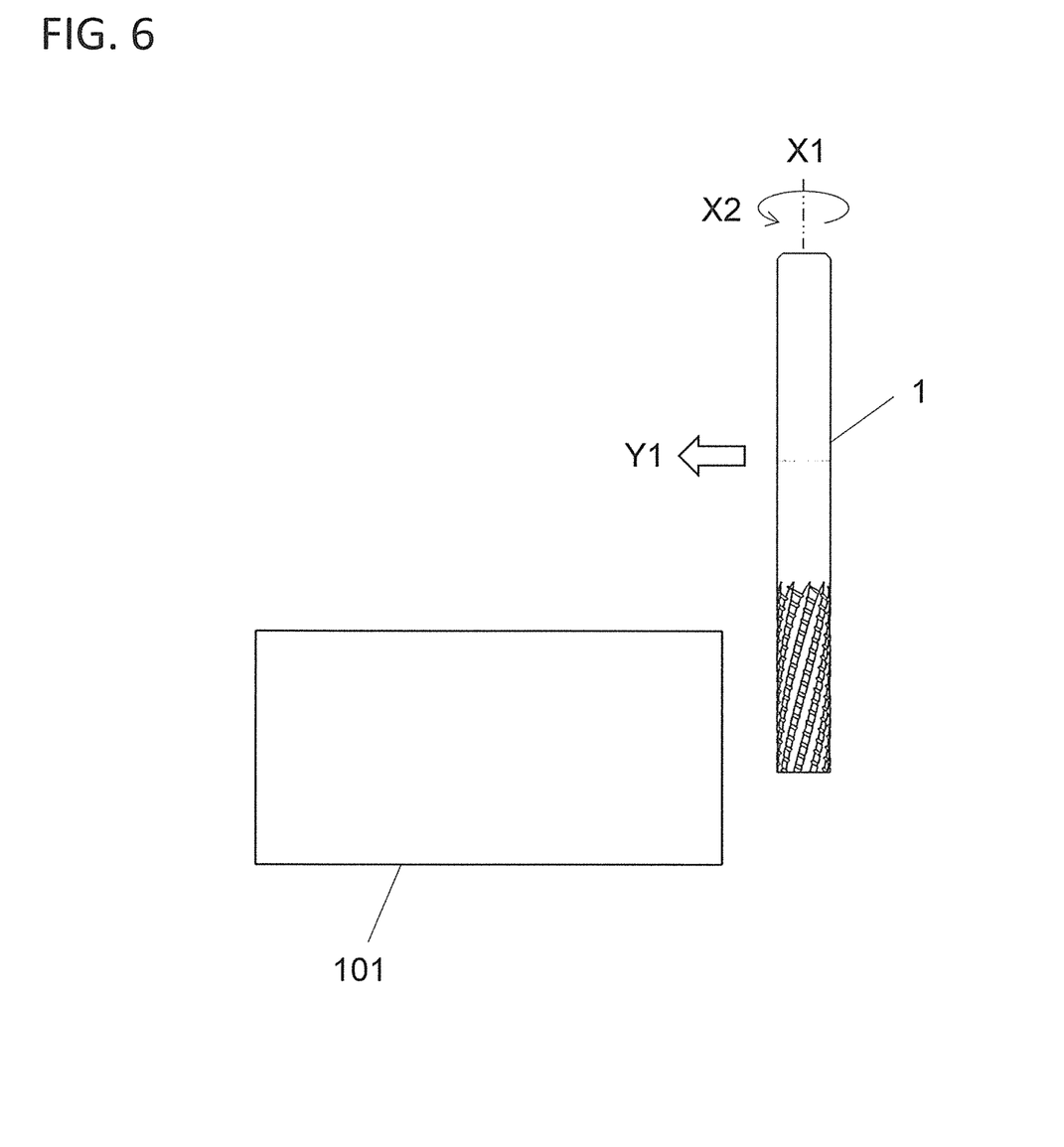
FIG. 6 is a schematic diagram illustrating one step in a method for manufacturing a cut product in a non-limiting embodiment.
Figure 7:
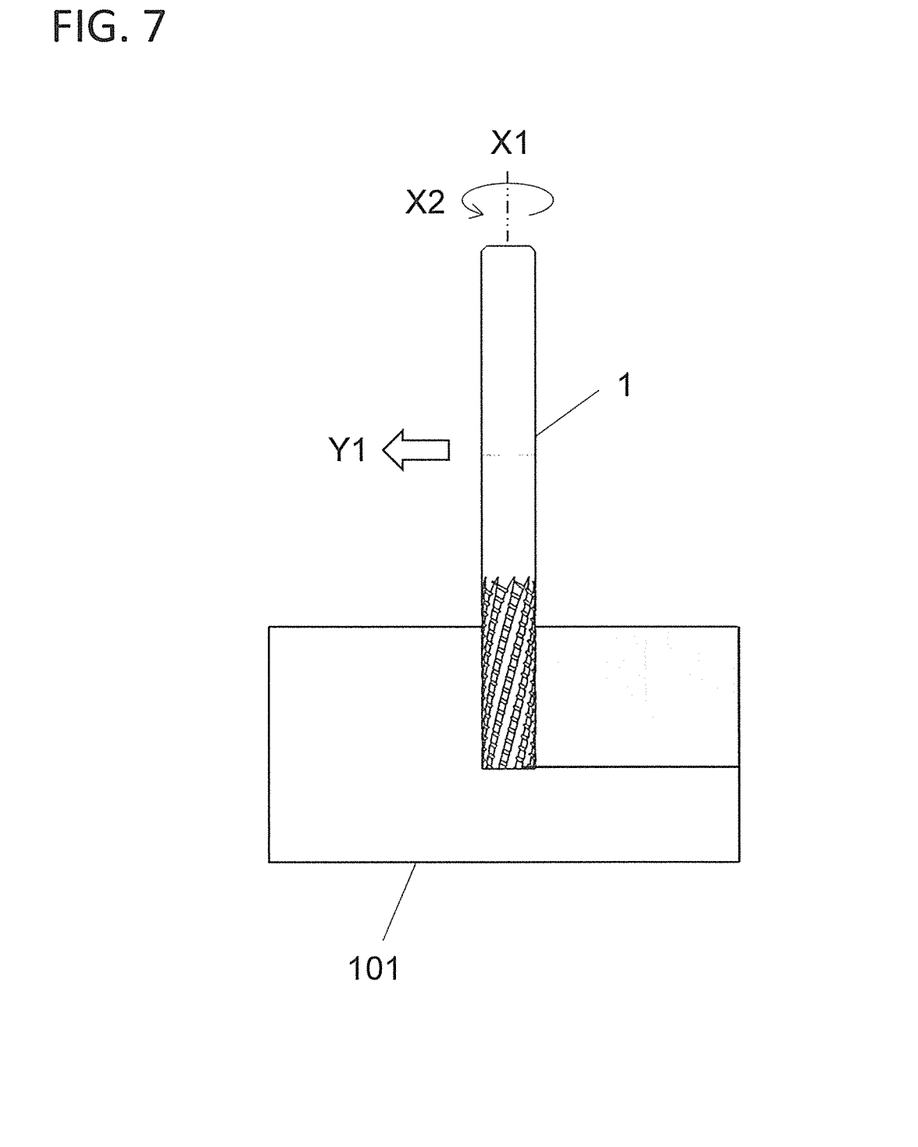
FIG. 7 is a schematic diagram illustrating one step in the method for manufacturing a cut product in a non-limiting embodiment.
Figure 8:
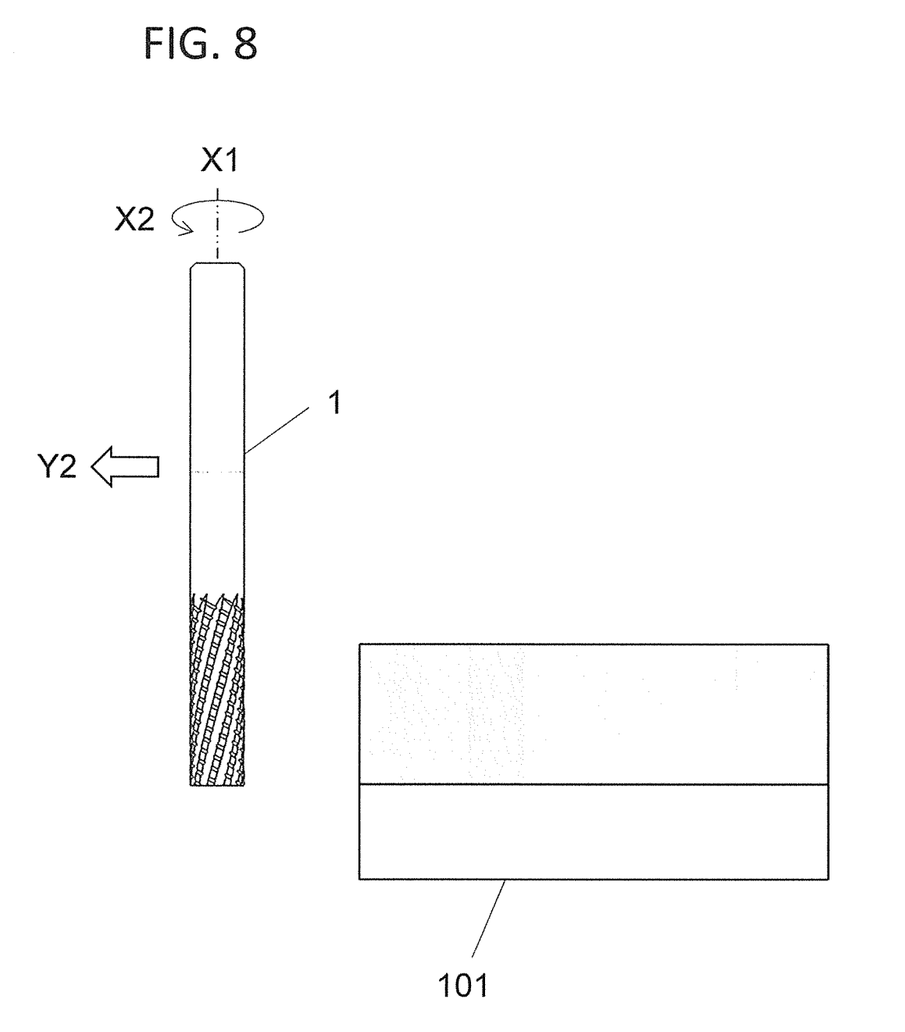
FIG. 8 is a schematic diagram illustrating one step in the method for manufacturing a cut product in a non-limiting embodiment.

FIGS. 6 to 8 illustrate the steps of a shoulder milling of a workpiece as a non-limiting embodiment of the method for manufacturing a cut product. To make it easier to visually understand, a machined surface cut out by the end mill 1 is illustrated by being colored in FIGS. 7 and 8.

The method for manufacturing a cut product in the non-limiting embodiments includes the following steps (1) to (3).

The step (1) is to bring the end mill 1 near a workpiece 101 in Y1 direction by rotating the end mill 1 about the rotation axis and in an arrow X2 direction (refer to FIG. 6).

The above step can be carried out, for example, by fixing the workpiece 101 onto a table of a machine tool with the end mill 1 attached thereto, and by bringing the end mill 1 being rotated near the workpiece 101. The workpiece 101 and the end mill 1 may be brought closer to each other in this step. For example, the workpiece 101 may be brought near the end mill 1.

The step (2) is to cut out the workpiece 101 by bringing the end mill 1 further near the workpiece 101 so that the end mill 1 being rotated comes into contact a desired position on a surface of the workpiece 101 (refer to FIG. 7).

The first cutting edge and the second cutting edge are brought into contact with a desired position on the surface of the workpiece 101 in the above step. Examples of the cutting process include a grooving process and a milling process besides the shoulder milling as illustrated in FIG. 7.

The step (3) is to move the end mill 1 away from the workpiece 101 in Y2 direction (refer to FIG. 8).

The workpiece 101 and the end mill 1 may be separated from each other in the above step as in the case of the step (1). For example, the workpiece 101 may be moved away from the end mill 1.

Excellent machining properties are obtainable through the steps as described above.

In cases where the cutting process of the workpiece 101 as described above is carried out a plurality of times, specifically, if a single workpiece is subjected to a plurality of cutting processes, the step of bringing the end mill 1 into contact with different locations of the workpiece 101 may be repeated while the end mill 1 is kept in rotation.

DESCRIPTION OF THE REFERENCE NUMERALS 1 rotary tool (end mill)
3 main body
3a first end
3b second end
5 holding part
7 cutting part
9 first flute
11 first cutting edge
13 second flute
15 second cutting edge
101 workpiece

What is claimed is:

1. A rotary tool, comprising:
a main body having a circular columnar shape, the main body comprising a rotation axis and extending from a first end to a second end, wherein
the main body comprises:
   a plurality of first flutes that are located on an outer periphery of the main body and run at a helix angle θ1 toward a rear side in a rotation direction of the rotation axis going along the main body toward the second end;
   a first cutting edge located on at least a part of a ridge line where the outer periphery of the main body intersects with the plurality of first flutes;
   a plurality of second flutes that are located on the outer periphery of the main body and run at a reverse helix angle θ2 toward a front side in the rotation direction of the rotation axis as going along the main body toward the second end, the plurality of second flutes intersecting with the plurality of first flutes; and
   a second cutting edge located on at least a part of a ridge line where the outer periphery of the main body intersects with the plurality of second flutes,
wherein
   the reverse helix angle θ2 is larger than the helix angle θ1, and
   m≥5, m−n≥3;
   m and n are coprime numbers, where m is a number of the plurality of first flutes and n is a number of the plurality of second flutes; and
   a maximum width of each of the plurality of second flutes is smaller than a distance between first flutes adjacent to each other, in the rotation direction of the rotation axis, in the plurality of first flutes.

2. The rotary tool according to claim 1, wherein a depth of each of the plurality of second flutes is larger than the maximum width of each of the plurality of second flutes.

3. The rotary tool according to claim 1, wherein the helix angle θ1 is 0°<θ1<45° and the reverse helix angle θ2 is 45°<θ2<90°.

4. The rotary tool according to claim 1, wherein the first cutting edge comprises a plurality of first cutting edge elements divided by the second flutes, and the second cutting edge is overlapped with an orthogonal line to the rotation axis at an end portion of the first cutting edge element which is located at a side of the second end in a side view.

5. A method for manufacturing a cut product, comprising:
rotating the rotary tool according to claim 1;
bringing the rotary tool being rotated into contact with a workpiece; and
moving the rotary tool away from the workpiece.

* * * * *

UNITED STATES PATENT AND TRADEMARK OFFICE
CERTIFICATE OF CORRECTION

| | |
|---|---|
| PATENT NO. | : 11,642,729 B2 |
| APPLICATION NO. | : 16/608231 |
| DATED | : May 9, 2023 |
| INVENTOR(S) | : Masahiro Waki |

It is certified that error appears in the above-identified patent and that said Letters Patent is hereby corrected as shown below:

In the Claims

Claim 3, Column 8, Line 41 please change the phrase "0°<01<45°" to --0°<θ1<45°--

Claim 3, Column 8, Line 42 please change the phrase "45°<02<90°" to --45°<θ2<90°--

Signed and Sealed this
Twenty-seventh Day of June, 2023

Katherine Kelly Vidal
*Director of the United States Patent and Trademark Office*